UNITED STATES PATENT OFFICE.

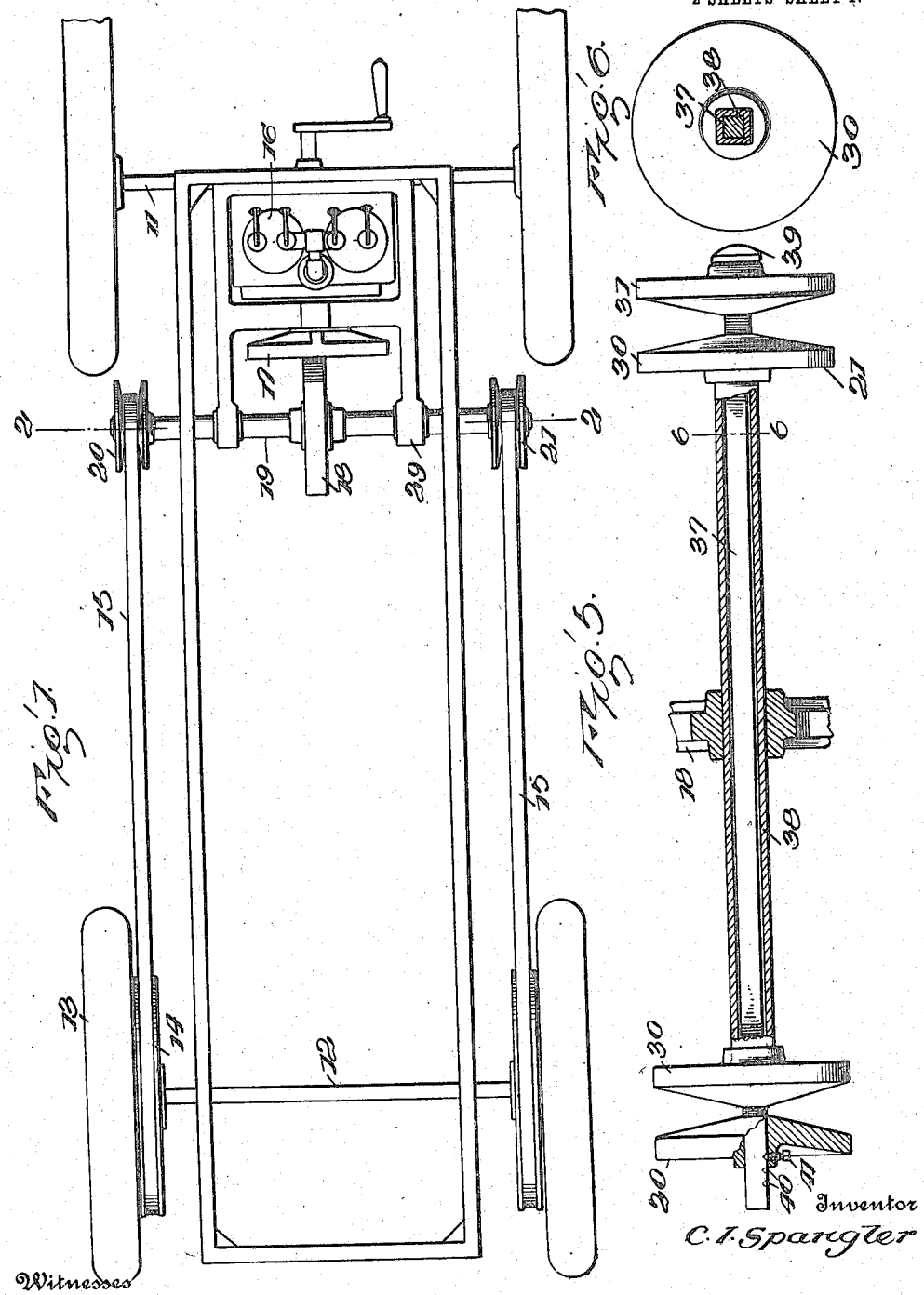

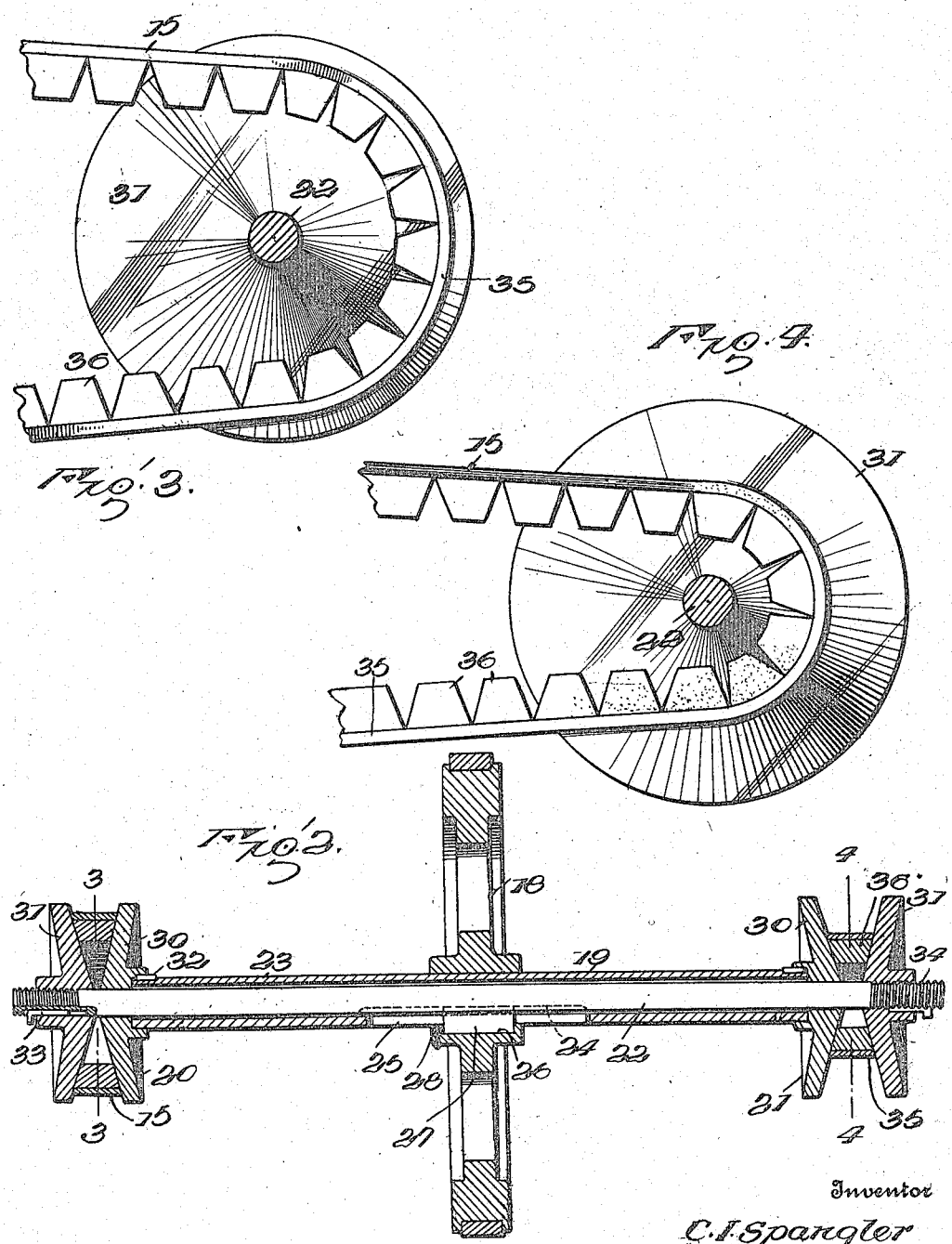

CHESTER I. SPANGLER, OF MAYFIELD, KANSAS.

DIFFERENTIAL GEARING.

1,129,366.

Specification of Letters Patent. Patented Feb. 23, 1915.

Application filed April 18, 1914. Serial No. 832,799.

*To all whom it may concern:*

Be it known that I, CHESTER I. SPANGLER, a citizen of the United States, residing at Mayfield, in the county of Sumner and State of Kansas, have invented certain new and useful Improvements in Differential Gearings, of which the following is a specification.

My invention relates to new and useful improvements in differential gearing, the primary object of my invention being the provision of a simple, cheap and durable form of differential gearing, light in its construction and therefore, particularly well adapted for use on cycle cars.

More specifically, the object of my invention is to provide a differential gearing for cycle cars employing independent belt drives from a common engine driven shaft to the tractor wheels of the car, the belts being trained about pulleys carried by the driven shaft and by the wheels.

A further object of my invention is to provide a differential gearing of the above type which will also compensate for unequal wear upon the belts or the use of belts of different widths, such as is often the case when one belt wears out before the other, necessitating the use of one old and one new belt.

A still further object of my invention is to construct a differential gearing or compensating device which does not include any gears or other expensive and easily injured parts, and which, when applied to the car will not materially increase its weight.

With these and other objects in view, my invention will be more fully described, illustrated in the accompanying drawings, and then specifically pointed out in the claims which are attached to and form a part of this application.

In the drawings:—Figure 1 is a top plan view of the running gear of a conventional form of cycle car showing my improved differential gearing in operation. Fig. 2 is a detail sectional view taken on the line 2—2 of Fig. 1. Fig. 3 is a transverse sectional view taken on the line 3—3 of Fig. 2, showing the position of the outer belt when rounding a curve. Fig. 4 is a similar view taken on the line 4—4 of Fig. 2, showing the position of the inner belt under like conditions. Fig. 5 is an elevation, partially in section, illustrating a slightly modified form of construction. Fig. 6 is a transverse sectional view taken through the line 6—6 of Fig. 5.

Corresponding and like parts are referred to in the following description and indicated in all the views of the accompanying drawings by the same reference characters.

In order to insure a clear and comprehensive understanding of my improved differential gearing I have illustrated the same in connection with a conventional form of cycle car having a frame 10 supported upon front and rear axles 11 and 12, the rear or traction wheels 13 of the car being mounted to revolve freely upon the rear axle 12 and each carrying a drive pulley 14, the peripheral face of which is provided with a substantially V-shaped groove or channel to receive the drive belt 15. The engine 16 is mounted in the forward portion of the frame and drives a friction disk 17 which may be reciprocated longitudinally of the car to move it into or out of engagement with a friction wheel 18 carried by what may be best termed, the drive shaft 19 of the car. As will be later explained the friction wheel 18 may be reciprocated longitudinally of the drive shaft to engage against the friction disk 17 at selected positions between its center and peripheral edge to provide for changes in speed. As this form of friction drive transmission is common and well-known a further description is deemed to be unnecessary.

My invention, in the present instance, consists in the peculiar construction of the driving shaft member, the manner of mounting the friction wheel 18 thereon and the manner of mounting the pulleys 20 and 21 over which the belts 15 are trained. For an understanding of these parts attention is directed more specifically to Fig. 2 of the drawings, in which it will be seen that the drive shaft 19 includes a shaft proper 22 inclosed in a sleeve 23. This shaft proper is provided centrally with an elongated key way 24 and the sleeve with a slot 25 registering with the keyway. The hub of the friction-wheel 18 is interiorly channeled to provide a keyway 26 to receive a key 27 which seats in the keyway 26 and keyway 24 extending through the slot 25 of the sleeve. This key may be secured in place in the keyway 26 by a pin or other suitable fastening means 28. The keyway 24 and slot 25 should be of sufficient length to permit transverse reciprocation of the friction wheel 18 to a distance substantially equal to the diameter of the friction disk 17.

The sleeve 23 is journaled for rotation in suitable bearings 29 carried by the car frame, being also held against longitudinal movement in the bearings in any suitable manner. As shown in Fig. 2, the keyway 24 is preferably somewhat longer than the slot 25 in order to insure a possibility of longitudinal movement of the shaft 22 in the sleeve 23, irrespective of the position which the friction wheel 18 occupies upon the shaft member 19.

As the pulleys 20 and 21 are identical in construction a description of one will suffice for both. Each of these pulleys consists of two parts 30 and 31, the former part in each case being secured to the end of the sleeve 23 by a key 32 or other suitable means while the latter part is similarly secured upon the end of the shaft 22 by a key 33. As clearly shown, these parts are formed with opposed, equally inclined belt-engaging faces, each part being in fact, substantially conical and the parts being mounted with their apexes adjacent each other, thereby coacting to provide a pulley having to all intents and purposes, a V-shaped belt-engaging groove 9. It should be noted, however, that the ends of the shaft 22 are threaded, as shown at 34 in such a manner that before application of the keys 33 the pulley members 31 may be adjusted toward and away from each other. When assembling the differential gearing the pulley members 31 are so mounted on their shaft that in central position of the shaft with respect to the sleeve 19 each pulley member 31 will be spaced from its corresponding pulley member 30, the space between the two being equal and being such that the belts 15 will bear against the intermediate portions of the belt-engaging faces of the pulley members. Under these conditions it will be apparent that added strain applied to either belt in excess of that applied to the other, will cause such belt to move inwardly, and consequently, draw the shaft 22 toward that end of the sleeve 23 and so, force the opposite belt to move outwardly. As any movement of either belt inwardly or outwardly increases or decreases the diameter of the drive pulley with which it is engaged, it will be clear that with the above described structure any excess of load applied to one pulley will cause a reduction in its effective diameter and a corresponding increase in the effective diameter of the other drive pulley, one constantly increasing and the other decreasing until they reach such a point that the load on both pulleys is balanced.

The belt employed may be of any suitable type, a number of different types being in common use in connection with V pulleys, the preferred form being that of an endless belt proper 35, provided on its inner face with a plurality of spaced friction lugs 36, usually formed of leather or rubber with their sides inclined inwardly to correspond to the inclination of the pulley faces with which they engage. Such a belt has a relatively large frictional contact with the grooves of the pulleys over which it is trained and at the same time possesses remarkable flexibility and may, therefore, be employed with relatively small pulleys, if desired.

From the foregoing description taken in connection with the drawings, it is thought that the operation of my improved differential gearing will be readily understood.

It will of course be clear that in passing around a curve the load upon the inner wheel of the two rear traction wheels is considerably increased, while the load upon the outer wheel is correspondingly decreased. As a result of this, the pulley members of that pulley upon the inner side of the car are forced away from each other while those at the other side of the car are drawn toward each other. The drive pulley for the inner belt is, therefore, decreased in diameter, reducing the rate at which the inner rear wheel is driven, while the drive pulley at the outer side of the car is increased in diameter, consequently, increasing the rate at which the outer wheel is driven. When the wheels are driven at proper relative speeds for the curve about which the car is passing it will be apparent that the load upon both belts will remain balanced and the pulleys remain in the position described until the course of the car becomes straight. The reverse action will then take place until the diameters of both pulleys are equal, the load upon both tractor wheels being then equal.

In Figs. 5 and 6 I have illustrated a modified form of construction in which I employ a shaft 37 angular in cross section as shown in Fig. 6, being preferably square and a sleeve 38 correspondingly shaped in cross section to slidably receive the shaft and hold it against independent turning movement. This sleeve is exteriorly angular in cross section in order that the friction wheel 18 may be secured against independent rotation upon it without the employment of keys or other fastening means.

The hub portions of the inner pulley members 30 are shaped or recessed to directly receive the ends of the sleeve 38 and are, therefore, secured to the sleeve without the use of any keys or other fastening device. One end of the shaft is enlarged to provide a head 39 to prevent or limit outward movement of the adjacent outer pulley member 31 and the other end is provided with a plurality of sockets 40 to receive a set-bolt 41 by means of which the other outer pulley member may be adjustably secured upon the shaft. With this form of differential gearing one of the outer pulley members is first applied to the shaft and moved into engagement with the head 39, the coacting inner pulley member then applied, the sleeve then applied to the shaft, the friction wheel to the sleeve and the other inner and outer pulley members applied, the locking of the last applied outer pulley member serving to lock all parts against disengagement. The space permitted between the pulley members of both the pulleys may, of course, be readily controlled by the positioning of the single set-bolt 41.

From the foregoing description it will be apparent that the parts may be assembled and secured in operative relation to each other in an infinite number of ways and for this reason I do not wish to at all limit myself to the specific details of construction illustrated in the drawings and described in the specification as various minor changes in these details may be made at any time without in the slightest degree departing from the spirit of my invention, as set forth in the appended claims.

Having thus described the invention what is claimed as new is:—

1. A differential mechanism including a driven member, driving elements carried by said member, each including coacting sections movable toward and away from each other to vary their drive ratios, and means operable upon movement of the members of either drive element toward each other for moving the members of the other drive element away from each other.

2. A differential mechanism including a driven member, drive pulleys carried by said member, each including coacting sections movable toward and away from each other to provide belt-receiving faces of varying diameters, and means operable upon movement of the sections of either pulley toward each other for moving the sections of the other pulley away from each other.

3. A differential mechanism including a driven member, drive pulleys carried by said member, each including coacting sections movable toward and away from each other to provide belt-receiving faces of varying diameters, means operable upon movement of the sections of either pulley toward each other for moving the sections of the other pulley away from each other, and means dependent upon the relative loads applied to the pulleys for moving the sections thereof.

4. A differential mechanism including a compound driven element, sectional belt-receiving devices actuated by the driven element, the sections of each belt-receiving device being mutually adjustable and adapted to be automatically actuated for increasing or decreasing the diameters of their active belt-engaging surfaces.

5. A differential mechanism including a compound driven element, sectional belt-receiving devices actuated by the driven element, the sections of each belt-receiving device being mutually adjustable and adapted to be automatically actuated for increasing or decreasing the diameters of their active belt-engaging surfaces, said automatic actuation being dependent upon the relative loads imposed upon the belt-receiving devices.

6. A differential mechanism including a driven element, sectional belt-receiving devices rotatable therewith, the sections thereof being adapted to automatically move relative to each other to vary the diameter of the active belt-engaging surfaces, each device being mutually adjustable, and the corresponding sections of the several devices being operatively connected whereby the adjustment of coacting sections automatically effects an opposite adjustment of the coacting sections of the other device.

7. A differential mechanism including a shaft, a sleeve surrounding the shaft, pulley sections carried by the ends of the sleeve, and coacting pulley sections carried by the ends of the shaft, adjacent pulley sections being adapted to receive belts between their opposed faces, said faces being inclined away from each other.

8. A differential mechanism including a shaft, a sleeve surrounding the shaft, pulley sections carried by the ends of the sleeve, coacting pulley sections carried by the ends of the shaft, adjacent pulley sections being adapted to receive belts between their opposed faces, said faces being inclined away from each other, the shaft being movable longitudinally through the sleeve but secured to rotate therewith.

9. A differential mechanism including a shaft, a sleeve surrounding the shaft, pulleys including coacting sections mounted at each end of the sleeve and shaft, one section of each pulley being mounted upon the sleeve and one upon the shaft, the opposed faces of the said sections being inclined outwardly from each other to provide coacting belt-engaging faces, and means permitting reciprocation of the shaft in this sleeve while locking the two for simultaneous rotation.

10. A differential mechanism including a driven element, belt-receiving pulleys mounted at either end of the driven element to rotate therewith, each pulley including coacting sections having opposed conical belt-receiving faces whereby movement of the sections toward or away from each other will increase or decrease the effective driving diameter of the pulley, and means whereby movement of the sections of one pulley toward each other will cause movement of the sections of the other pulley away from each other.

11. A differential mechanism including a shaft provided with a longitudinal key-way, a sleeve surrounding the shaft with a slot registering with the key-way, a drive wheel surrounding the sleeve, a key carried by the drive wheel and extending through the slot of the sleeve and into the key-way of the shaft whereby the drive wheel may be moved longitudinally of the sleeve and shaft and the shaft also moved longitudinally of the sleeve, pulley sections secured to the ends of the sleeve and provided with outer conical faces, and pulley sections secured to the ends of the shaft and provided with inner coacting conical faces.

12. A differential mechanism including a shaft having angular faces, a sleeve having interiorly angular faces to engage the shaft whereby the two will rotate simultaneously, the shaft being provided at one end with a head, the sleeve medially and at its ends having angular faces, a drive wheel mounted medially of the sleeve and locked to rotate therewith by such angular faces, pulley sections having outer conical belt-engaging faces mounted upon the ends of the sleeve to rotate therewith, and corresponding pulley sections having inner conical belt-engaging faces mounted upon the shaft.

13. A differential mechanism including a shaft having angular faces, a sleeve having interiorly angular faces to engage the shaft whereby the two will rotate simultaneously, the sleeve medially and at its ends having angular faces, a drive wheel mounted medially of the sleeve and locked to rotate therewith by such angular faces, pulley sections having outer conical belt engaging faces mounted upon the ends of the sleeve to rotate therewith, corresponding pulley sections having inner conical belt-engaging faces mounted upon the shaft, the shaft at one end having a head preventing disengagement of the adjacent pulley section, and means for securing the outer pulley section at the other end to the shaft.

14. A differential mechanism including a shaft having angular faces, a sleeve having interiorly angular faces to engage the shaft whereby the two will rotate simultaneously, the sleeve medially and at its ends having angular faces, a drive wheel mounted medially of the sleeve and locked to rotate therewith by such angular faces, pulley sections having outer conical belt-engaging faces mounted upon the ends of the sleeve to rotate therewith, corresponding pulley sections having inner conical belt-engaging faces mounted upon the shaft, the shaft at one end having a head preventing disengagement of the adjacent pulley section, and means for securing the outer pulley section at the other end to the shaft, said means permitting longitudinal adjustment of the said pulley section toward and away from that end of the shaft having the head.

In testimony whereof I affix my signature in presence of two witnesses.

CHESTER I. SPANGLER. [L. S.]

Witnesses:
C. A. WATSON,
SOPHIA SHAUERS.